United States Patent
Wetherill et al.

(10) Patent No.: US 8,100,335 B2
(45) Date of Patent: Jan. 24, 2012

(54) METHOD AND SYSTEM FOR SYSTEM ADMINISTRATION USING RADIO FREQUENCY IDENTIFICATION

(75) Inventors: John Douglas Wetherill, Los Gatos, CA (US); Kevin Joseph McDonnell, Union City, CA (US)

(73) Assignee: Oracle America, Inc., Redwood City, CA (US)

( * ) Notice: Subject to any disclaimer, the term of this patent is extended or adjusted under 35 U.S.C. 154(b) by 1156 days.

(21) Appl. No.: 11/490,221

(22) Filed: Jul. 19, 2006

(65) Prior Publication Data

US 2008/0017698 A1   Jan. 24, 2008

(51) Int. Cl.
*G06K 19/06*   (2006.01)

(52) U.S. Cl. ... 235/492; 340/10.1; 340/10.4; 340/10.41; 340/10.5

(58) Field of Classification Search ............ 235/375, 235/382, 493, 492; 340/10.1, 10.4, 10.41, 340/10.5
See application file for complete search history.

(56) References Cited

U.S. PATENT DOCUMENTS

| | | | | |
|---|---|---|---|---|
| 4,980,542 A | * | 12/1990 | Jackson et al. | 235/375 |
| 5,204,768 A | * | 4/1993 | Tsakiris et al. | 398/107 |
| 6,695,215 B2 | * | 2/2004 | Robertson | 235/492 |
| 6,804,786 B1 | * | 10/2004 | Chamley et al. | 726/20 |
| 7,617,523 B2 | * | 11/2009 | Das et al. | 726/5 |

* cited by examiner

*Primary Examiner* — Daniel Hess
*Assistant Examiner* — Michael Andler
(74) *Attorney, Agent, or Firm* — Polsinelli Shughart, PC

(57) ABSTRACT

A method for performing system administration using radio frequency identification (RFID) is disclosed. In one embodiment, the method includes detecting a radio frequency identification device, reading the device for information contained within the card, determining whether the information contains a request to perform a task to administer a computer system, and executing the task in response to the request if the information contains the request.

17 Claims, 9 Drawing Sheets

METHOD AND SYSTEM FOR SYSTEM ADMINISTRATION USING RADIO FREQUENCY IDENTIFICATION

FIELD

An embodiment of the invention relates to system administration, and more specifically, to employing radio frequency identification for system administration.

BACKGROUND

Presently, system administration is performed using peripheral devices, such as keyboard and mouse. For example, for any maintenance or administrative task to be performed on a system, a user is required to use a peripheral device to access the system to execute the task. This use of peripheral devices allows for unauthorized persons to fiddle with the system, particularly when the system is left unattended. Furthermore, such devices are cumbersome and bulky and occupy valuable desk space that can otherwise be used for other purposes. Conventional peripheral devices do not provide the type or level of security that is necessary for any system to have even if it is left unattended.

SUMMARY

According to one embodiment, a method for performing system administration using radio frequency identification (RFID) is disclosed. The method includes detecting a radio frequency identification device, reading the device for information contained within the card, determining whether the information contains a request to perform a task to administer a computer system, and executing the task in response to the request if the information contains the request.

Other embodiments are also disclosed. Further, the above attributes may be implemented using a computer program, a system, or an apparatus, or any combination thereof. These and other details of one or more embodiments of the present invention are set forth in the accompanying drawings and in the description below.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

In the following description, numerous details are set forth. It will be apparent, however, to one skilled in the art that embodiments of the present invention may be practiced without these specific details. In other instances, well-known structures, devices, and techniques have not been shown in detail, in order to avoid obscuring the understanding of the description. The description is thus to be regarded as illustrative instead of limiting.

Figure 1:
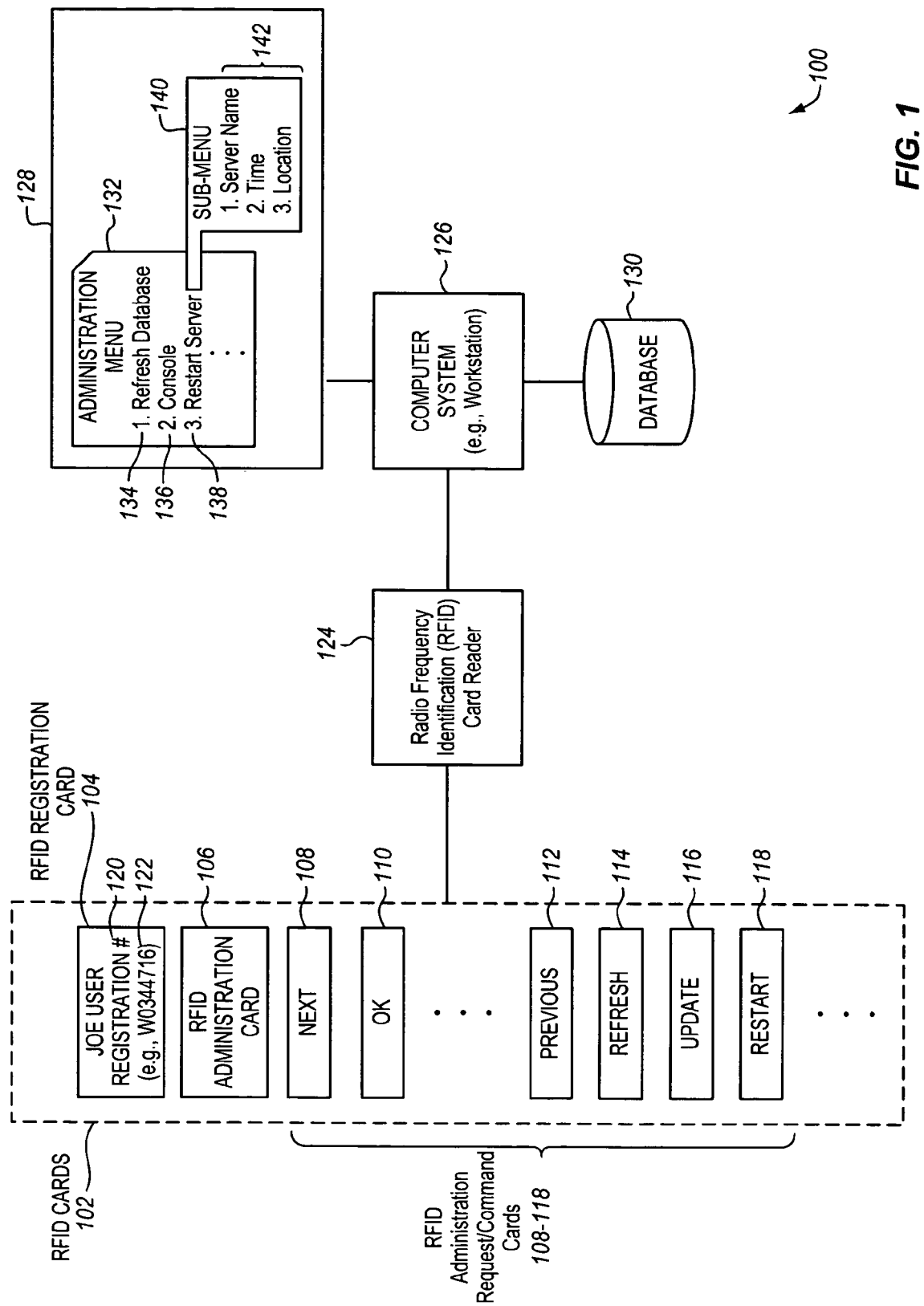
FIG. 1 illustrates an embodiment of a mechanism for employing RFID cards for performing system administration.

FIG. 1 illustrates an embodiment of a mechanism 100 for employing RFID cards 104-118 for performing system administration. In one embodiment, mechanism 100 includes a set of RFID cards 102 that are in communication with reader 124 that is further in communication with system 126, which is in communication with display 128 and database 130. The illustrated mechanism 100 is provided in a simplified form for brevity and clarity and that it is not limited in anyway to what is illustrated. For example, cards 102 are illustrated, but as discussed below, any number of cards that is lower or greater than the number of cards illustrated can be used. Also, for brevity and clarity, cards 102 are illustrated here and used throughout this document in the subsequent figures merely as an example of a device that can carry RFID messages and signals; however, any number and type of devices that can be embedded with RFID may be used and that each RFID card 104-118 illustrated here is merely one example of RFID devices that can be employed.

A registration card 104 is given to an attendee to use when seeking access to system 126. Card 104 may include identification information, such as user name 120 and user registration number 122. In one embodiment, each card 104-118 (e.g., a smart card) is embedded with RFID including an RFID chip (e.g., MIFARE®) and RFID antenna. The RFID chip, for example, may contain the identification information, such as user name 120 and user registration number 122. Such information is stored via electronic RFID tags on card 104, but the information may also be stored at database 130 coupled with system 126. The user presents card 104 to reader 124 by having the card 104 within the acceptable proximity of the reader 124 to gain authority to access system 126. There may be various levels and types of such authority, such as an authority to enter a room where the target system 126 may be located, an authority to access parent system before system 126 could be accessed, and the like.

By presenting RFID card 104 to reader 124, the reader 124 reads the information contained stored in RFID tags of card 104 via the RFID antenna of card 104. RFID may be referred to as a wireless data technology that uses electronic RFID tags for storing data on an RFID device, such as RFID cards 102. For example, the RFID tags may be used to identify items or individuals, store data, provide signals, and the like. RFID tags may include one or more of a combination of passive, semi-passive, or active tags. A semi-passive tag may include a battery that powers the tag, but otherwise do not have the requisite power to send a transmission signal to an antenna. Active tags may include a power source that supports that tag powering up, as well as supports transmitting signals to an antenna. In one embodiment, RFID tags holding information (e.g., registration/identification information on card 104, administrative information on card 106, administrative requests/commands on card 108-118, etc.) are provided in association with an RFID chip contained in each card 104-118. Each RFID card 104-118 further includes an RFID antenna to broadcast the information for reader 124 to reader each time the card 104-118 is scanned on the reader 124.

If the user is an authorized or privileged user (e.g., system administrator, developer, etc.), the user receive an RFID-based administration card 106 to gain privileged access to system 126 to be able to exercise administrative rights (e.g., administrative tasks) relating to system 126. When card 106 is scanned within an acceptable proximity of reader 124, the administrative information about the user is read and verified and subsequently, menu 132 is displayed to allow the user to perform various administrative tasks relating to system 126. System 126 is in communication with a display device 128 which displays menu 132 listing tasks 134-138. For brevity and simplicity, refresh database 134, console 136, and restart server 138 for menu 132 and items 142 for menu 140 are illustrated, but it is contemplated that any number and type of menus and items may be included, provided, and displayed. Each item 134-138, 142 is associated with an administrative task.

In one embodiment, RFID cards 108-118 embedded with administrative commands or requests are used to navigate items 134-138, 142 provided via menus 132, 140. In one embodiment, card 108 includes an embedded next command to select the next item on menu 132, 140, while card 110 includes an embedded okay command to run a particular item on menu 132, 140. For example, if console 136 is currently highlighted (e.g., console 136 is selected with cursor on the item 136), the user may use the next card 108 to proceed to the next item that is restart server 138 on menu 132. If the user wishes to restart the server, the okay card 110 may be used to trigger the command restart server 138. On the other hand, the user may continue to use card 108 to continue on to the next item. Once the last item on menu 132 is reached, the user may use card 108 to roll up to the first item, such as refresh database 134 on menu 132, and continue to navigate using cards 108, 110.

In one embodiment, additional cards 112-118 (e.g., shortcut cards) may be provided for an even easier navigation of items 134-138, 142 on menu 132, 140. Such cards 112-118 may include card 112 having embedded with a previous command to help the user select a previous item on menu 132, 140, such as navigating from restart server 138 to console 136 on menu 132. As with card 108, card 112 can be used go keep moving, such as to continue moving to the previous item until the first item is reached, such as item 134 on menu 132, after which the list rolls back to the last item, such as item 138 on menu 132. Card 114 having embedded with a refresh command may be used to refresh items 134-138, 142 on menu 132, 140, card 116 having embedded with an update command may be used to update items 134-138, 142 on menu 132, 140, and card 118 having embedded with a restart command may be used to restart menu 132, 140. Although cards 112-118 may be used to provide shortcuts for frequently accessed commands of menu 132, 140, the maintenance and administration of system 126 can be performed using a combination of merely two cards, such as next/okay cards 108 and 110 or previous/okay cards 112 and 110.

In one embodiment, when card 110 is scanned in the proximity of reader 124 to submit a command, such as restart server 138, another menu or sub-menu 140 may be opened and displayed with additional items 142 to further maintenance, control, and administration of system 126. Similarly, another menu may be associated with one or more items 142 of menu 140. It is contemplated that a menu or sub-menu may not be associated with each item 134-138, 142 of each menu/sub-menu 132, 140. On the contrary, it is also contemplated that multiple menu may be associated with a single item 134-138, 142. Using merely a couple of RFID cards (e.g., next/okay cards 108 and 110), the user can navigate a rich menu hierarchy of items 134-138, 142 and access a wide range of functionality. In one embodiment, encapsulating menus 132, 140 and their items 134-138, 142 in Extensible Markup Language (XML) containing the display text and the associated Uniform Resource Locator (URL) allows a user interface to be fully extended and customized without modifying a user interface (UI) code, but instead by providing an additional functionality on a backend servlet. This mechanism 100 allows a complete control, maintenance and administration of system 126 using a minimum number of gestures or cards, such as next/okay cards 108 and 110, which also provides a significant ease of accessibility for people with handicaps along with providing the necessary security of system 126 and a general ease of maintaining the system 126, eliminating the need for having various conventional peripheral devices (e.g., keyboard, mouse, etc.).

Figure 2:
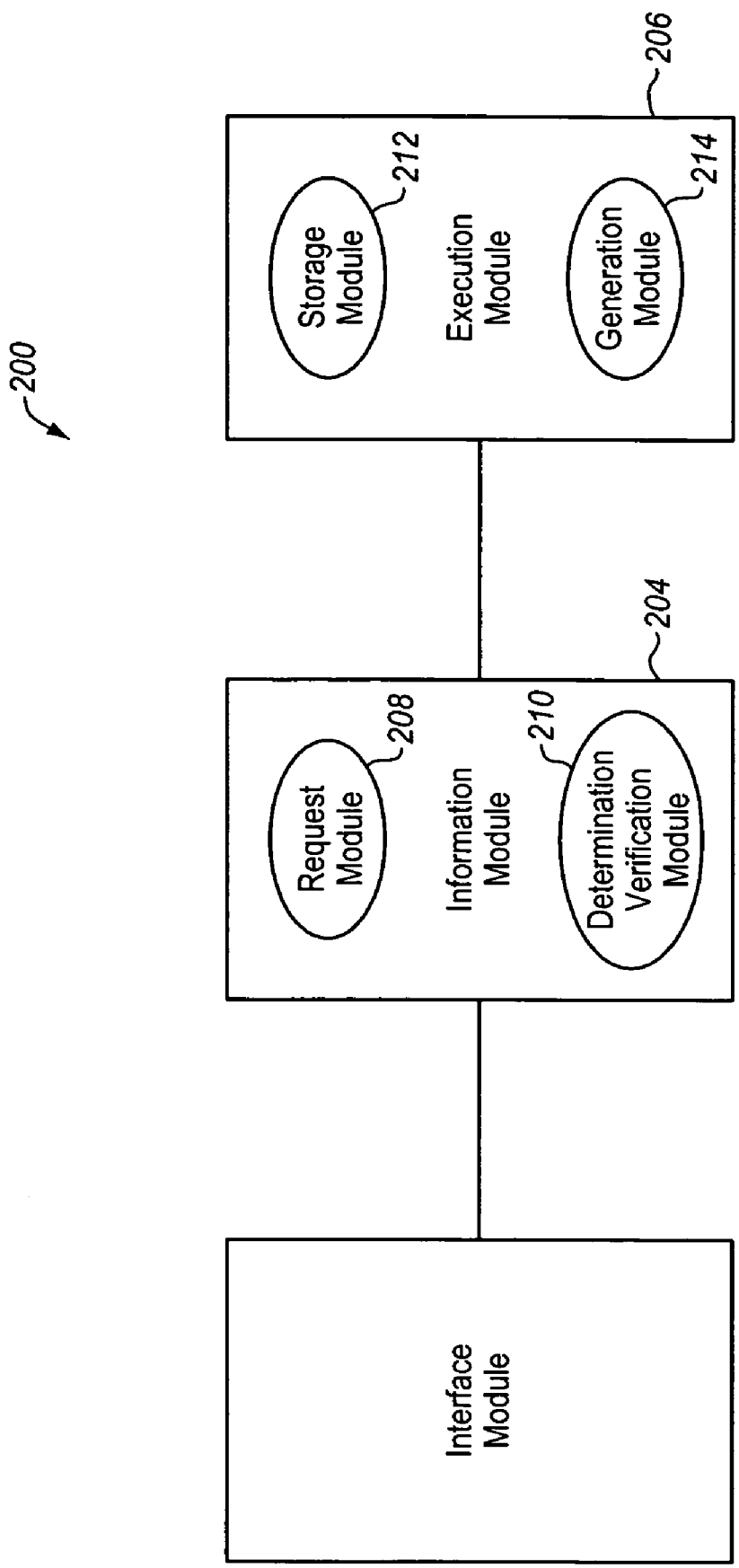
FIG. 2 illustrates an embodiment of a mechanism for employing RFID cards for performing system administration.

FIG. 2 illustrates an embodiment of a mechanism 200 for employing RFID cards for performing system administration. The illustrated mechanism 200 includes interface module 202, information module 204 having request module 208 and determination and verification module 210, and execution module 206 having storage module 212 and generation module 214. Interface module 202, for example, includes a human interface device (HID) application (e.g., C HID application) having an HID module or code (e.g., C HID code). HID refers to interfaces or devices that enable users to input data or interact directly with computer systems. Information module 204, for example, includes a JavaScript™, an Asynchronous JavaScript™ and XML (AJAX™) application, and the like. JavaScript™ refers to a scripting language that is supported in Web browsers and other Web tools. AJAX™ refers to an enhancement in JavaScript™ to allow Web pages to be more interactive and behave like local applications. For example, AJAX™ allows a Web page to retrieve small amounts of data from the server without reloading the entire page. Execution module 206, for example, includes a servlet (e.g., Java™ servlet) that includes a Java™ application residing at a Web server or application server to provide server-side processing.

Interface module 202, in one embodiment, provides an interface between RFID cards and RFID card readers. The HID module of interface module 202 may reside at an RFID card reader to poll various Universal Serial Bus (USB) devices for card events, such as detecting the RFID card when it is presented to the reader. When a card is presented to the reader, the HID module of interface module 202 extracts the information from the card as if the information was typed in using a keyboard or other peripheral devices. The information may include general registration or identification information, such as user name, registration number, enrollment status, etc. The information may also include an administrative request or command when a card is embedded with the command (e.g., next, previous, okay, etc.) to help trigger an administrative task or function. Any such information is then stored at a database for verification or future reference.

In one embodiment, the information (e.g., registration number, administrative command, etc.) is sent to detection and verification module 210 at information module 204.

Information module 204 may be running at another module or application, such as in a Web browser (e.g., Netscape Navigator®, Internet Explorer®, etc.). Detection and verification module 210 determines whether the RFID card is a registration card or an administration card or an administration command/request card and then, subsequently and accordingly, updates the display and invokes execution module 206. In other words, in case of a registration card and a general administration card, the registration information and administration information, respectively, is determined, read, and stored at a database using storage module 212. In case of an administration command RFID card that is embedded with an administration task request or command (e.g., next, okay, etc.), the request or command is recognized, read, and then provided to execution module 206 to be performed. If the execution of the command results in a selection of an item from the current menu that triggers another menu, generation module 214 generates such new menu of items. The results (e.g., the new menu or sub-menu) of the command execution are then sent to information module 204 to be displayed on a display device. The first menu or parent menu may be generated and/or displayed as soon as the user is recognized as a privileged user, such as when a general administration RFID card is scanned on the reader.

Execution module 206 is used to perform various administrative tasks (e.g., executing a command) as requested by request module 208 and detected and verified by detection and verification module 210 of information module 204. Execution module 206 is further to store registration data at a database via storage module 212 and to generate menus and menu descriptions and items via generation module 214. Execution module 206 may encapsulate various administration functionalities. When execution module 206 is invoked, using a request Uniform Request Identifier (URI), the context path that is extracted from the URI may contain the specific command to be executed. For example, in the following URI: http://localhost/refreshdatabase, the context path is "/refreshdatabase" which instructs execution module 206 to perform its "refreshdatabase" function.

Each user interface command may be represented by a menu element which is formatted as XML data and is comprised of a display element and a URL element. The display element may be used to specify the text that is to be displayed in the menu. The URL element may be used to specify the command that is to be executed when the associated menu item is executed. In the following XML representation, the text "Refresh Database" is presented to the user, while the associated command is sent to execution module 206 when the menu item or command to be executed is http://localhost/refreshdatabase.

```
<menu>
  <item>
    <display>Refresh Database</display>
    <url>/refreshdatabase</url>
  </item>
</menu>
```

Figure 3:
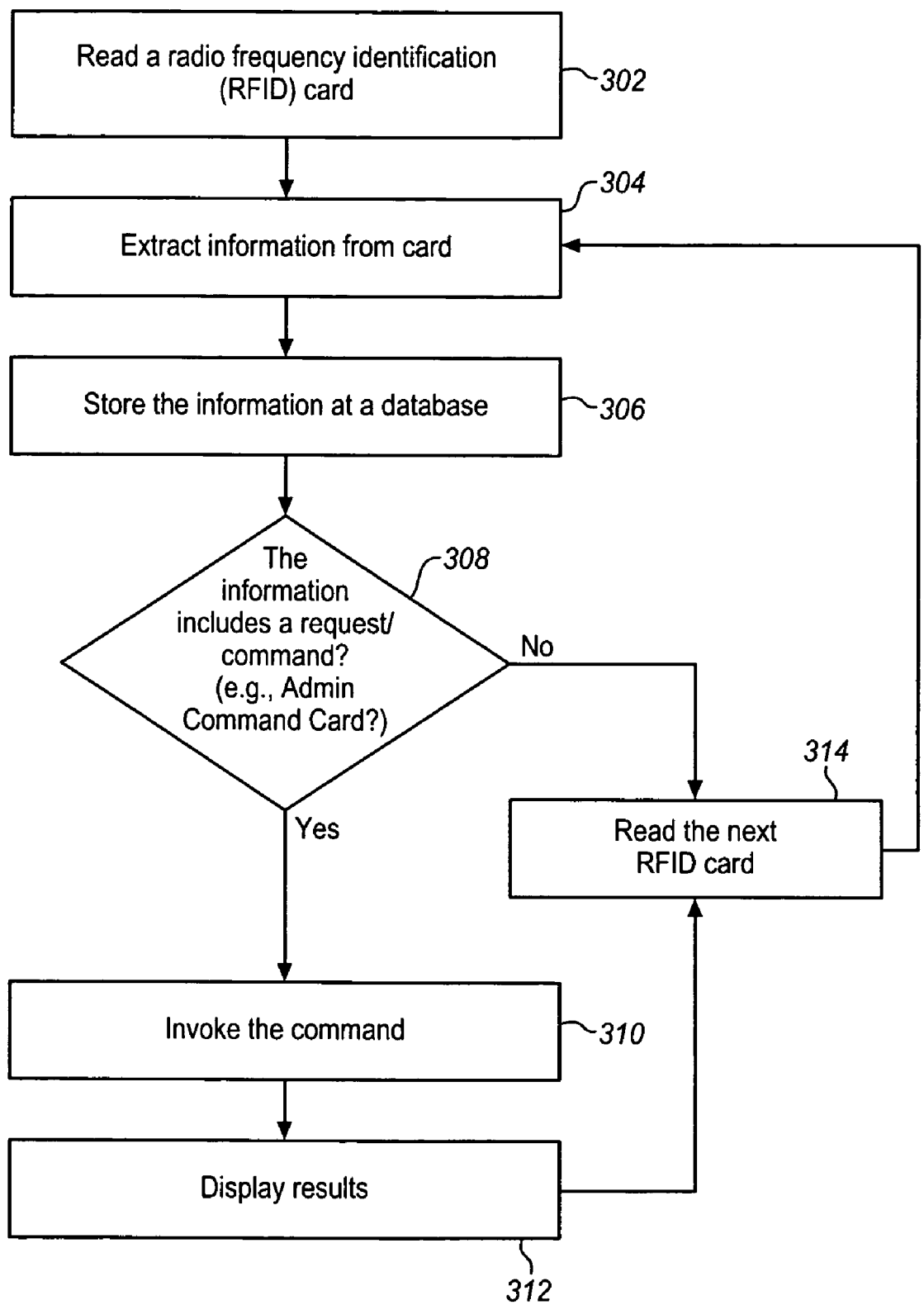
FIG. 3 illustrates an embodiment of a process for employing RFID cards for performing system administration.

FIG. 3 illustrates an embodiment of a process for employing RFID cards for performing system administration. At processing block 302, in one embodiment, an RFID card is read by a reader as the card is presented to the reader within the proximity of the reader. At processing block 304, the information contained in the card is read and then extracted from the card. The information is then stored at a database at processing block 306. Whether the information contains a command or request is determined at decision block 308. If the RFID card is a registration card, it includes user identification and registration information, such as user name, user registration identification/number, etc. If the RFID card is a general or basic administration card, it includes administration information which further identifies the user as an authorized user (e.g., system administrator) who is allowed to administer a computer system. If the RFID card is a command or request card, it includes a command (e.g., next) that is to be executed when the user scans the RFID card at the reader. Such a command along with other commands (e.g., okay) are used to administer, monitor, maintain, and control the computer system. In one embodiment, a combination of two commands (e.g., next and okay, previous and okay, etc.) are sufficient to fully administer a computer system; however, other commands (e.g., refresh, update, etc.) may be provided via RFID cards to obtain shortcuts to further administer the system.

Referring back to decision block 308, if the information does not contain a command, the next RFID card is read at processing block 314 and the process continues with processing block 304. If the information contains a command, the command is invoked or executed by selecting the appropriate item from menu at processing block 310. The results of the command execution (e.g., refresh database, new menu, etc.) are displayed at a display device at processing block 312. Based on the displayed results, the user may choose the next card to invoke another command which is read at processing block 314, in which case the process continues at processing block 304. Otherwise, the process ends.

Figure 4:
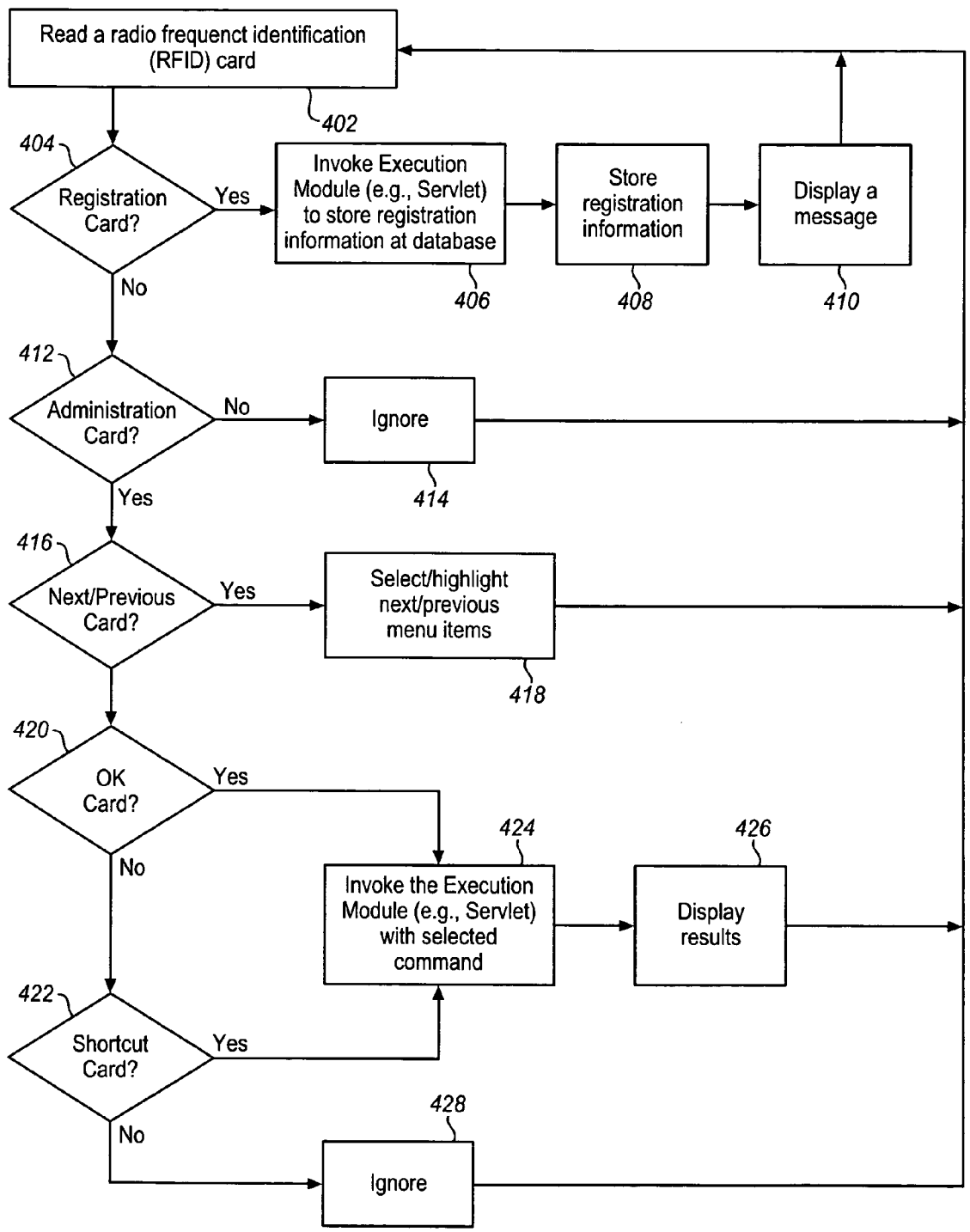
FIG. 4 illustrates an embodiment of a process for employing RFID cards for performing system administration.

FIG. 4 illustrates an embodiment of a process for employing RFID cards for performing system administration. In one embodiment, an RFID card is presented to an RFID card reader and read by the reader at processing block 402. Whether the card is a registration card is determined at decision block 404. If the RFID card contains registration information (e.g., user name, user registration identification, etc.), an execution module (e.g., servlet) is invoked to store the registration information at a database at processing block 406. The registration information is then stored at the database at processing block 408. A message (e.g., "Welcome Mr. User") is displayed on a display device for the user to see at processing block 410. The process then continues with the reading of the next card at processing block 402.

Referring back to decision block 404, if the card is not a registration card, a determination is made as to whether the card is an administration card at decision block 412. If the card is not an administration card, the card is ignored at processing block 414. The process then continues with processing block 402 with the reading of the next RFID card. In some cases, a message (e.g., "Card not recognized. Please try again.") may be displayed for the benefit of the user. The process continues with the reading of the next RFID card at processing block 402. Referring back to decision block 412, if the card is an administration card, the user is recognized as a system administrator and authorized to perform system administration. Furthermore, at decision block 412, a determination is made as to whether the RFID card is an administration command/request card. If it is a command card, whether the command card is a next or previous command administration card is determined at decision block 416. If the card is a next or previous card, the appropriate item on the menu is selected (e.g., the item is highlighted) at processing block 418. The process then continues with the reading of the next card at processing block 402.

If the card is not a next or previous command card, whether the card is an okay command card is determined at decision block 420. If the card is an okay card, the servlet is invoked with the selected command such that the command is executed (e.g., the task is performed) by invoking the selected item (which corresponds to the task being performed) at processing block 424. The results of the invoking of the servlet and subsequently executing the command are displayed at processing block 426. The results, for example, may include generating a new menu having items associated with the invoked item from the current menu. The process may then continue with the reading of the next RFID card at processing block 402. If the card is not an okay card, whether the card is a sundries command card (e.g., update card, refresh card, etc.) is determined at decision block 422. If the card includes such a shortcut card, the servlet is invoked with the selected command such that the command is executed at processing block 424. The results of the invoking of the servlet and subsequently executing the command are displayed at processing block 426. The process may then continue with the reading of the next RFID card at processing block 402. If the card does not include a shortcut card, the card is ignored at processing block 428 and the process continues with the reading of the next RFID card at processing block 402. In some cases, a message with respect to the ignoring of the card may be displayed for the benefit of the user.

Figure 5A:
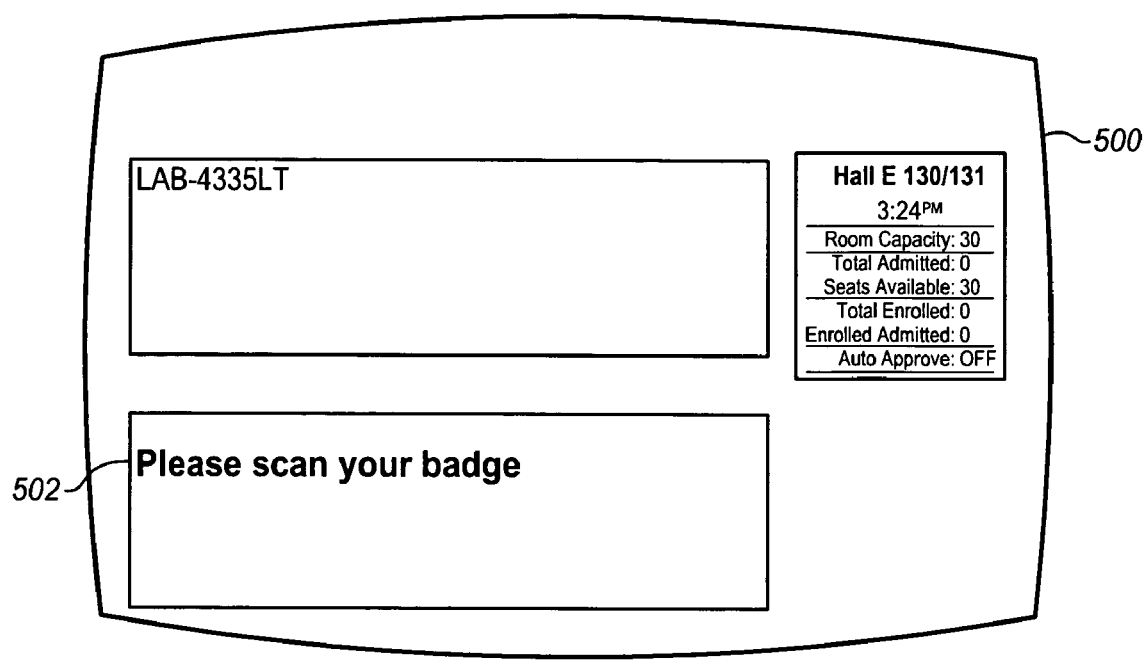
FIGS. 5A-5H are screenshots to illustrate an embodiment of employing RFID cards for performing system administration.
Figure 5B:
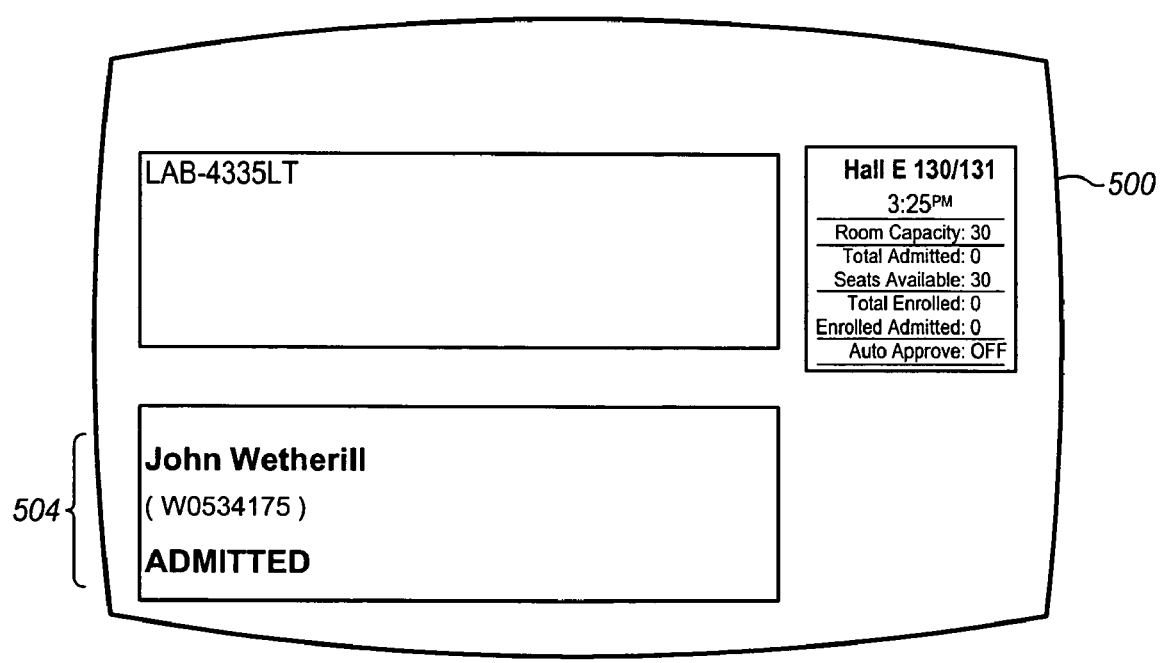
Figure 5C:
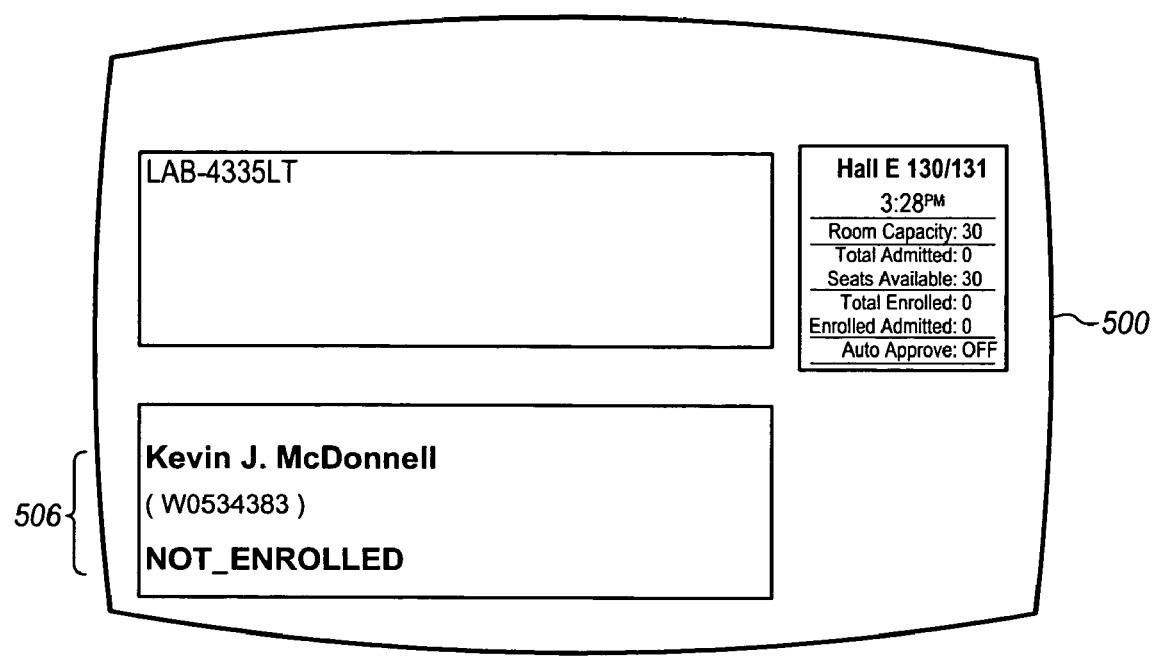
Figure 5D:
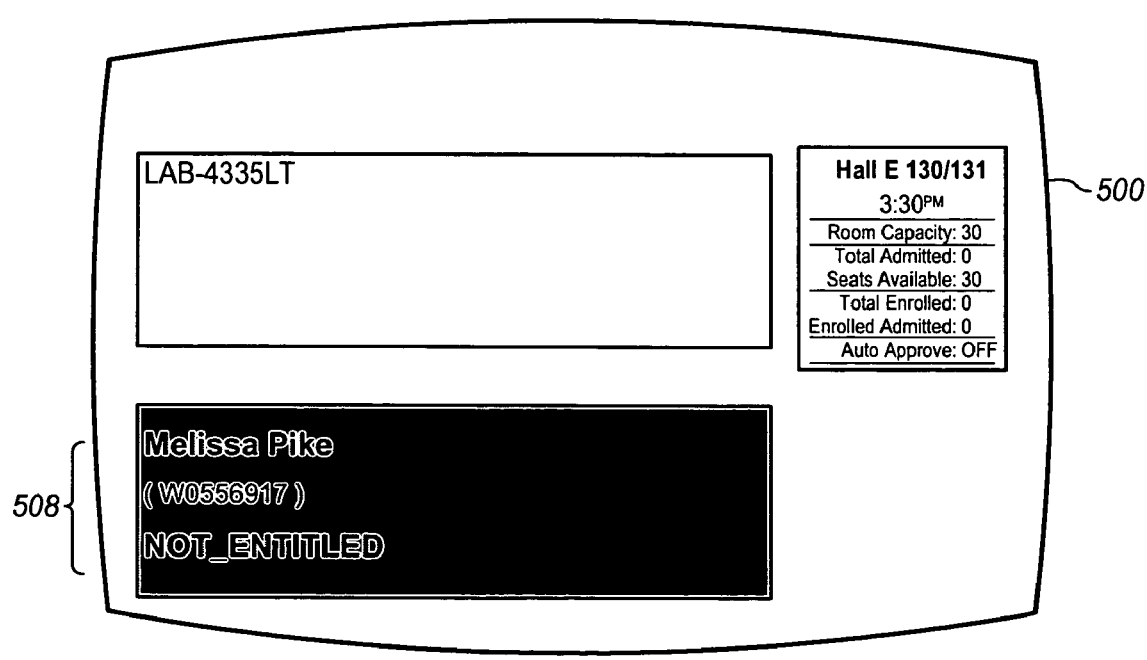

FIGS. 5A-5H are screenshots to illustrate an embodiment of employing RFID cards for performing system administration. FIG. 5A illustrates screen 500 which indicates a message 502 prior to a user scanning an RFID card or badge within the proximity of an RFID card reader. FIG. 5B illustrates screen 500 having a different message 504 after the user has scanned an RFID card, which in this case is a registration card having user registration information. After such information is read by the reader, it is provided as a message 504 on screen 500. Message 504 provides user information, such as user name, user registration identification number, and user status (e.g., admitted). FIGS. 5C and 5D illustrate screen 500, which provides user status information 506, 508 for two different non-enrolled users using different colors.

Figure 5E:
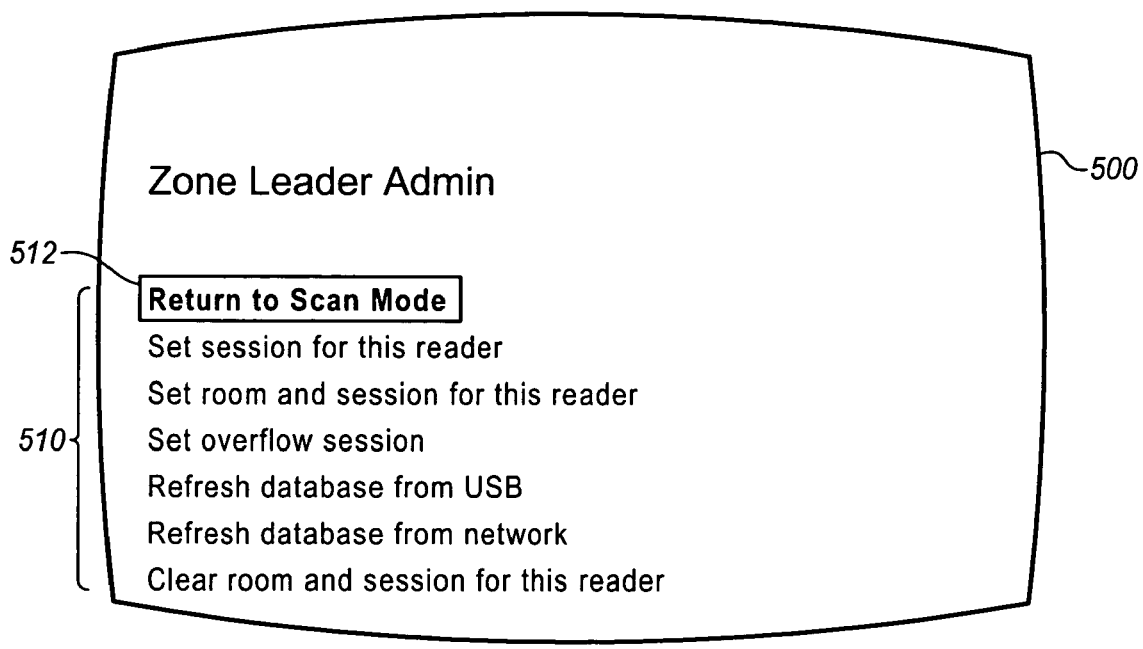
Figure 5F:
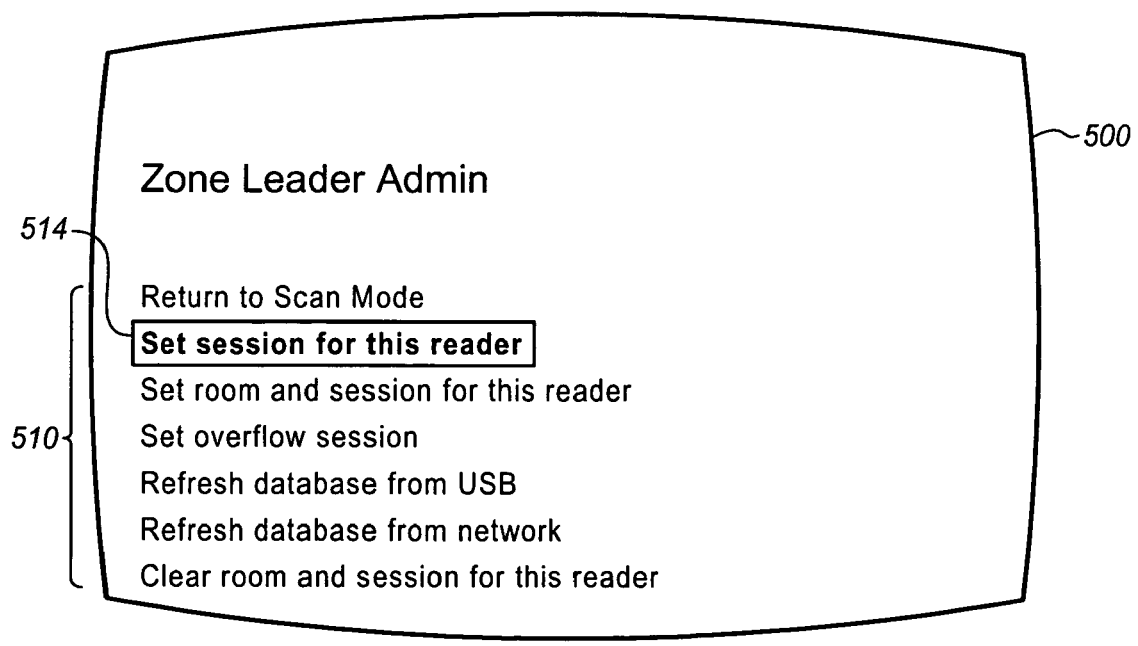
Figure 5G:
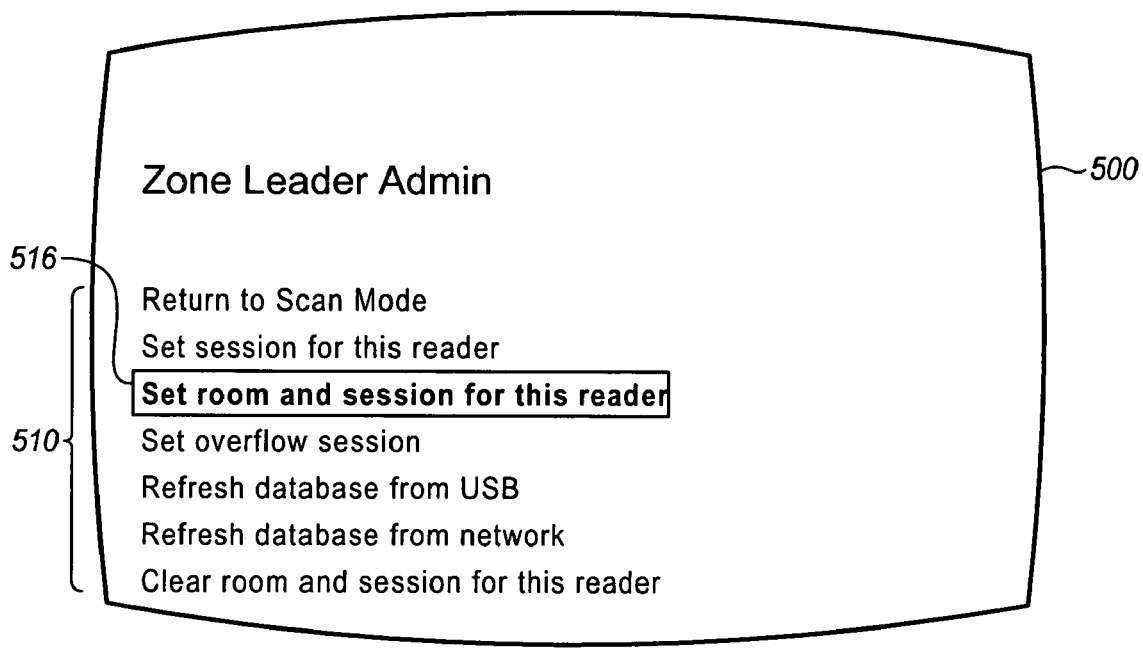
Figure 5H:
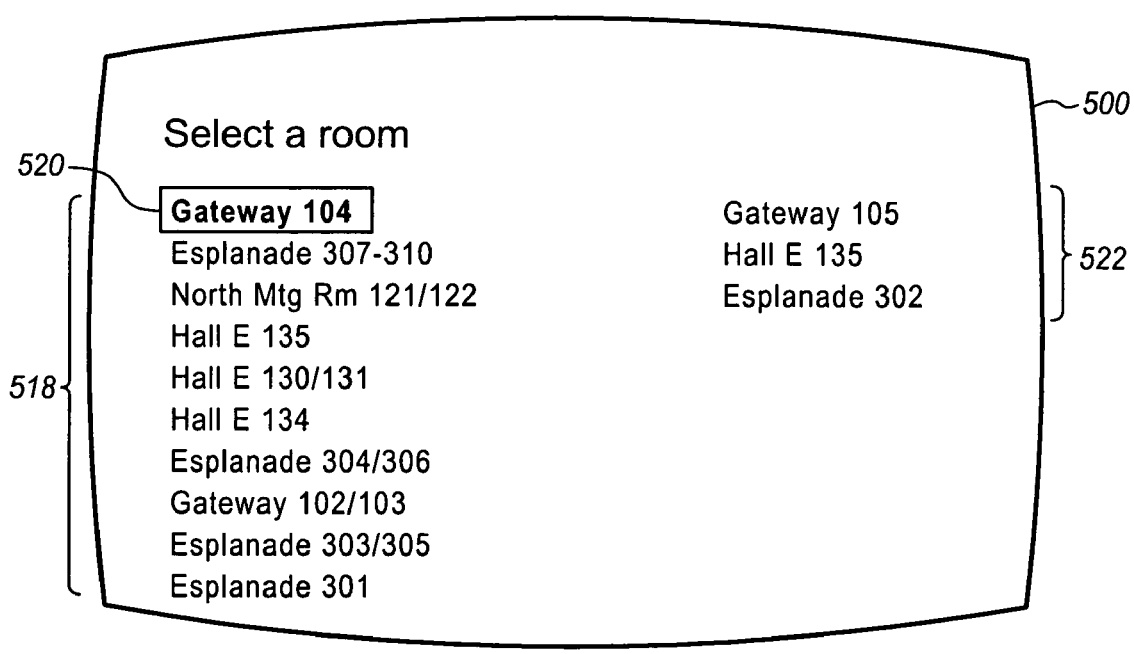

When an administration RFID card is presented to and read by the reader, an administration menu 510 is displayed on screen 500. The cursor is set on the first menu item 512 as illustrated in FIG. 5E. FIG. 5F illustrates that when a next RFID card is presented to the reader, the next command is invoked, resulting the next menu item 514 being selected/highlighted. FIG. 5G illustrates that when the next RFID card is presented again, the next command is invoked, resulting in the next menu item 516 being selected/highlighted. Referring now to FIG. 5H, it illustrates that when an okay RFID card is scanned at the reader, the okay command is invoked, which may result in another menu (or sub-menu) 518 being generated and displayed. When a new menu 518 is displayed (as with the previous menu 510), the first item 520 on menu 518 is highlighted. In the illustrated embodiment, the highlighting item 520 provides a sub-menu 522, the items of which relate to item 520 of menu 518.

Figure 6:
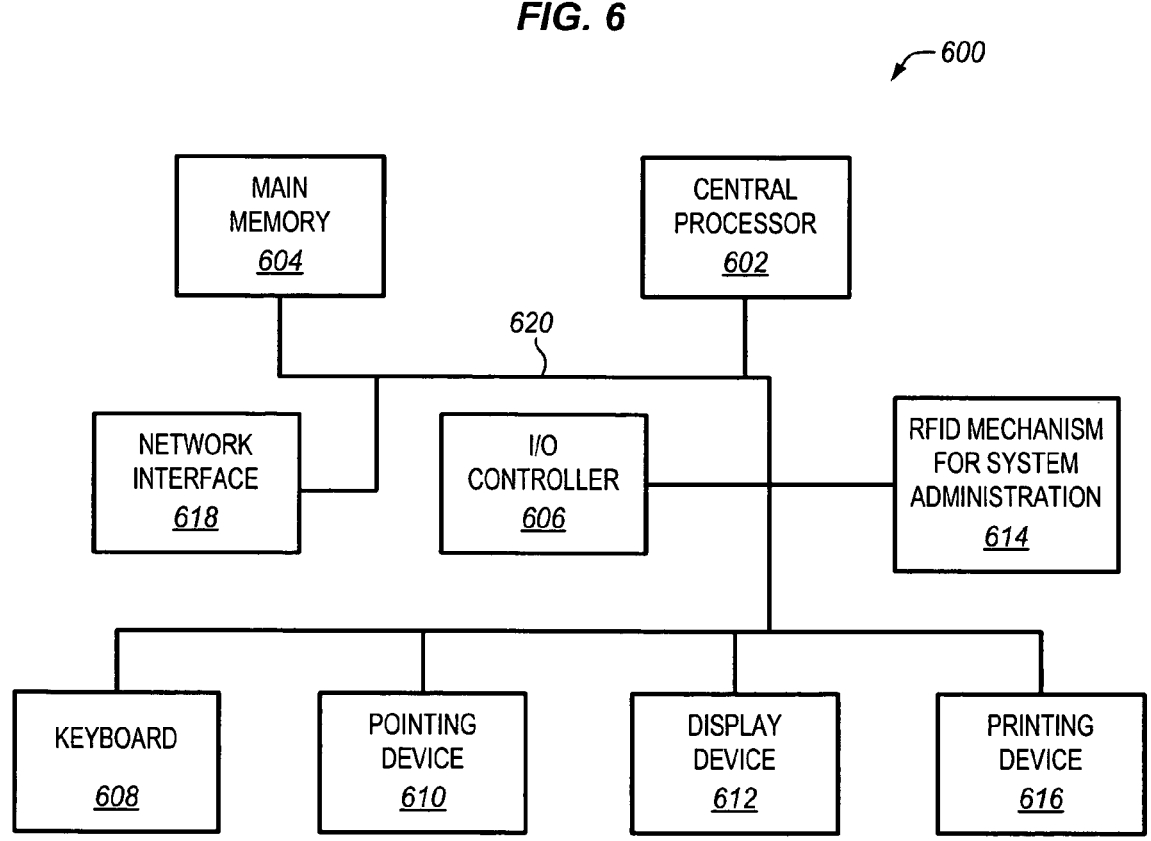
FIG. 6 illustrates an embodiment of a computer system.

FIG. 6 illustrates an embodiment of a computer system 600. Computer system 600 comprises a central processor 602, a main memory 604, an input/output (I/O) controller 606, a keyboard 608, a pointing device 610 (e.g., mouse, track ball, pen device, or the like), a display device 612, and a network interface 618. Additional input/output devices, such as a printing device 616, may be included in the system 600 as desired. As illustrated, the various components of the computer system 600 communicate through a system bus 620 or similar architecture.

In a further embodiment, computer system 600 may be a distributed computing system. In other words, one or more of the various components of the computer system 600 may be located in a physically separate location than the other components of the computer system 600. Such components may be accessed and connected via a network to the other components.

In one embodiment, computer system 600 includes a Sun® Microsystems computer utilizing a Scalable Processor Architecture (SPARC™) microprocessor available from several vendors (including Sun® Microsystems, Inc., of Santa Clara, Calif.). Those with ordinary skill in the art understand, however, that any number and type of computer systems may be utilized to provide one or more embodiments of the present invention, including those made by Hewlett Packard® of Palo Alto, Calif., and International Business Machines (IBM®)-compatible personal computers utilizing Intel microprocessors, which are available from several vendors (including IBM® of Armonk, N.Y.).

Also, instead of a single processor 602, two or more processors (whether on a single chip or on separate chips) can be utilized to provide speedup in operations. It is further envisioned that the processor 602 may be a complex instruction set computer (CISC) microprocessor, a reduced instruction set computing (RISC) microprocessor, a very long instruction word (VLIW) microprocessor, a processor implementing a combination of instruction sets, and the like.

The network interface 618 provides the communication capability with a host or other computer systems (as described in previous paragraph) on a same local network, on a different network connected via modems and the like to the present network, or to other computers across the Internet. In various embodiments, the network interface 618 can be implemented utilizing technologies including, but not limited to, Ethernet, Fast Ethernet, Gigabit Ethernet (such as that covered by the Institute of Electrical and Electronics Engineers (IEEE) 701.1 standard), wide-area network (WAN), leased line (such as T1, T3, optical carrier 3 (OC3), and the like), analog modem, digital subscriber line (DSL) and its varieties such as high bit-rate DSL (HDSL), integrated services digital network DSL (IDSL), and the like, cellular, wireless networks (such as those implemented by utilizing the wireless application protocol (WAP)), time division multiplexing (TDM), universal serial bus (USB) and its varieties such as USB II, asynchronous transfer mode (ATM), satellite, cable modem, FireWire, and the like.

Moreover, the computer system 600 may utilize operating systems, such as Solaris™, Windows® (and its varieties such as CE®, NT®, 2000®, XP®, ME®, and the like), HP-UX®, IBM-AIX®, PALM®, UNIX®, Berkeley software distribution (BSD) UNIX®, Linux, Apple UNIX (A/UX®), Macintosh® operating system (Mac OS®) (including Mac OS X®), and the like. Also, it is envisioned that in certain embodiments of the present invention, the computer system 600 is a general purpose computer capable of running any number of applications such as those available from companies including Oracle®, Siebel®, Unisys®, Microsoft®, and the like.

Computer system 600 may also include RFID mechanism 614 for system administration. RFID mechanism 614 may include RFID readers, RFID cards, and other modules and servlets to help use RFID cards to perform system administration. RFID mechanism 614 may be coupled to I/O controller 606 via a Universal Serial Bus (USB). For example, an RFID reader of then mechanism 614 may be coupled to an I/O controller 606 via one or more peripheral interfaces.

Processes taught by the discussion above may be performed with program code, such as machine-executable instructions, which can cause a machine (such as a "virtual machine", a general-purpose processor disposed on a semiconductor chip, a special-purpose processor disposed on a semiconductor chip, etc.) to perform certain functions. Alternatively, these functions may be performed by specific hardware components that contain hardwired logic for performing the functions, or by any combination of programmed computer components and custom hardware components.

Also, select embodiments of the present invention include various operations, which are described herein. The operations of the embodiments of the present invention may be performed by hardware components or may be embodied in machine-executable instructions, which may be in turn utilized to cause a general-purpose or special-purpose processor, or logic circuits programmed with the instructions, to perform the operations. Alternatively, the operations may be performed by a combination of hardware and software.

Furthermore, embodiments of the present invention may be provided as computer program products, which may include an article of manufacture including a machine-readable medium having stored thereon instructions used to program a computer (or other electronic devices) to perform a process according to embodiments of the present invention. The machine-readable medium may include, but is not limited to, floppy diskettes, hard disk, optical disks, CD-ROMs, and magneto-optical disks, read-only memories (ROMs), random-access memories (RAMs), erasable programmable ROMs (EPROMs), electrically EPROMs (EEPROMs), magnetic or optical cards, flash memory, or other types of media or machine-readable medium suitable for storing electronic instructions and/or data. Moreover, data discussed herein may be stored in a single database, multiple databases, or otherwise in select forms (such as in a table). Additionally, the program produces may be transferred from a radio computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

In addition to what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

It should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

The foregoing description has been directed to specific embodiments. It will be apparent to those with ordinary skill in the art that modifications may be made to the described embodiments, with the attainment of all or some of the advantages. Therefore, it is the object of the appended claims to cover all such variations and modifications as come within the spirit and scope of the invention.

What is claimed is:

1. A method comprising:
    detecting a first radio frequency identification (RFID) device;
    reading the first device for registration information to provide access to a computer system, the registration information including one or more of user name, user registration identification number and user enrollment status;
    detecting a second RFID device;
    reading the second device for information including a command to perform a navigational task to administer the computer system; and
    automatically executing the navigational task in response to reading the command.

2. The method of claim 1, further comprising generating a first menu having items associated with administrative tasks to administer the computer system, the first menu includes an item associated with the navigational task.

3. The method of claim 2, wherein the command comprises a command to select the item from the first menu, the method further comprising:
    invoking the selected item to execute the task.

4. The method of claim 3, further comprising generating a second menu in response to the invoking of the selected item, the second menu includes a sub-menu to the first menu.

5. The method of claim 1, wherein the command comprises a command to perform one or more of selecting a next item on the first menu or second menu, selecting a previous item on the first menu or the second menu, invoking a currently selected item on the first menu or the second menu, updating the first menu or the second menu, refreshing the first menu or the second menu, and restarting the first menu or the second menu.

6. The method of claim 1, wherein the second device comprises a RFID card, the card including electronic tags having the information, wherein the card further includes one or more of a RF1D chip and a RFID antenna.

7. The method of claim 1, further comprising:
    storing the information associated with the second device at a database; and
    displaying results of the executing of the navigational task via a display device.

8. A system comprising:
    an interface module to a detect a plurality of radio frequency identification (RFID) devices, and read the plurality of devices for information associated with the devices;
    an information module to determine whether the information associated with the plurality of devices includes registration information to provide access to a computer system and a command to perform a navigational task to administer the computer system; and
    an execution module to automatically execute the navigational task in response to reading the command if the information includes the command.

9. The system of claim 8, wherein the execution module comprises a generation module to generate a first menu having items associated with administrative tasks to administer the computer system, the first menu includes an item associated with the navigational task.

10. The system of claim 9, wherein the command comprises a command to select the item from the first menu and the execution module is further configured to:
 invoke the selected item to execute the administrative task.

11. The system of claim 9, wherein the command comprises a command to perform one or more of selecting a next item on the first menu or a second menu, selecting a previous item on the first menu or the second menu, invoking a currently selected item on the first menu or the second menu, updating the first menu or the second menu, refreshing the first menu or the second menu, and restarting the first menu or the second menu.

12. The system of claim 8, wherein the plurality of devices comprise a RFID card, the card including electronic tags having the information, wherein the card further includes one or more of a RFID chip and a RFID antenna.

13. The system of claim 8, wherein the registration information includes one or more of user name, user registration identification number, and user enrollment status.

14. An article of manufacture comprising a machine-readable medium having instructions which when executed cause a machine to:
 detect a first radio frequency identification (RFID) device;
 read the first device for registration information to provide access to a computer system, the registration information including one or more of user name, user registration identification number and user enrollment status;
 detect a second RFID device;
 read the second device for information including a command to perform a navigational task to administer the computer system; and
 automatically execute the navigational task in response to reading the command.

15. The article of manufacture of claim 14, wherein the instructions when further executed, cause the machine to generate a first menu having items associated with administrative tasks to administer the computer system, the first menu includes an item associated with the navigational task.

16. The article of manufacture of claim 15, wherein the command comprises a command to select the item from the first menu and the instructions when further executed, cause the machine to:
 invoke the selected item to execute the administrative task.

17. The article of manufacture of claim 16, wherein the instructions when further executed, cause the machine to generate a second menu in response to the invoking of the selected item, the second menu includes a sub-menu to the first menu.

\* \* \* \* \*

UNITED STATES PATENT AND TRADEMARK OFFICE
CERTIFICATE OF CORRECTION

| | | |
|---|---|---|
| PATENT NO. | : 8,100,335 B2 | Page 1 of 1 |
| APPLICATION NO. | : 11/490221 | |
| DATED | : January 24, 2012 | |
| INVENTOR(S) | : John Douglas Wetherill et al. | |

It is certified that error appears in the above-identified patent and that said Letters Patent is hereby corrected as shown below:

In Column 10 line 42 Claim 6 should read "more of a RFID chip and a RFID antenna.".

Signed and Sealed this
Twenty-fifth Day of September, 2012

David J. Kappos
*Director of the United States Patent and Trademark Office*